United States Patent
Tang et al.

(10) Patent No.: US 8,966,234 B1
(45) Date of Patent: Feb. 24, 2015

(54) PLUGGABLE MODULE SUBCOMPONENT RESET

(75) Inventors: Norman Tang, Los Altos, CA (US);
David Lai, Mountain View, CA (US);
Liang Ping Peng, Santa Clara, CA (US);
Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 13/178,841

(22) Filed: Jul. 8, 2011

(51) Int. Cl.
*G06F 1/24* (2006.01)

(52) U.S. Cl.
USPC .................................................. 713/1; 713/2

(58) Field of Classification Search
USPC ......................................... 713/1, 2; 398/135
See application file for complete search history.

(56) References Cited

U.S. PATENT DOCUMENTS

| | | | | |
|---|---|---|---|---|
| 5,870,602 | A  * | 2/1999 | Miller et al. | 713/1 |
| 6,792,527 | B1 * | 9/2004 | Allegrucci | 713/1 |
| 7,149,430 | B2 * | 12/2006 | Hosking et al. | 398/137 |
| 7,845,016 | B2 | 11/2010 | Diab et al. | |
| 8,165,297 | B2 * | 4/2012 | Hoffmann | 380/256 |
| 2003/0128411 | A1 * | 7/2003 | Aronson et al. | 359/152 |
| 2004/0073847 | A1 * | 4/2004 | Booth | 714/43 |
| 2008/0127165 | A1 * | 5/2008 | Mullis et al. | 717/173 |
| 2009/0199044 | A1 * | 8/2009 | Hurrell | 714/23 |
| 2009/0240945 | A1 * | 9/2009 | Aronson | 713/176 |
| 2010/0325432 | A1 | 12/2010 | Tang et al. | |
| 2011/0058777 | A1 | 3/2011 | Gazzola et al. | |

* cited by examiner

*Primary Examiner* — Chun Cao
(74) *Attorney, Agent, or Firm* — Edell, Shapiro & Finnan, LLC

(57) ABSTRACT

Techniques are provided for resetting a microprocessor-based subcomponent of a pluggable module. Specifically, a host device connected to the pluggable module determines that the microprocessor-based subcomponent needs to be reset. The host device resets the microprocessor-based subcomponent without the need for a module level reset of the pluggable module.

17 Claims, 6 Drawing Sheets

US 8,966,234 B1

PLUGGABLE MODULE SUBCOMPONENT RESET

TECHNICAL FIELD

The present disclosure relates to pluggable network modules.

BACKGROUND

Host devices (switches, routers, etc.) may be configured to connect to pluggable modules that facilitate data communications within a network. Pluggable modules generally are transceivers that interface the host device with a fiber optic or copper networking cable. As such, pluggable modules are generally configured to convert electrical signals received from the host device into transmit signals for transmission via the network cable, and to convert receive signals received via the network cable into electrical signals usable by the host device.

Recently, pluggable modules have been configured to perform additional functions other than conversion of signals. These additional functions are enabled by microprocessor-based subcomponents within the module. Examples of microprocessor-based subcomponents include special purpose security or product source validation subcomponents, such as a security integrated circuit, analog-to-digital and digital-to-analog controllers, etc.

DESCRIPTION OF EXAMPLE EMBODIMENTS

Overview

Techniques are provided for resetting a microprocessor-based subcomponent in a pluggable module. A host device connected to the pluggable module determines that the microprocessor-based subcomponent needs to be reset. The host device then resets the microprocessor-based subcomponent without the need for a module level reset of the pluggable module.

Example Embodiments

Figure 1:
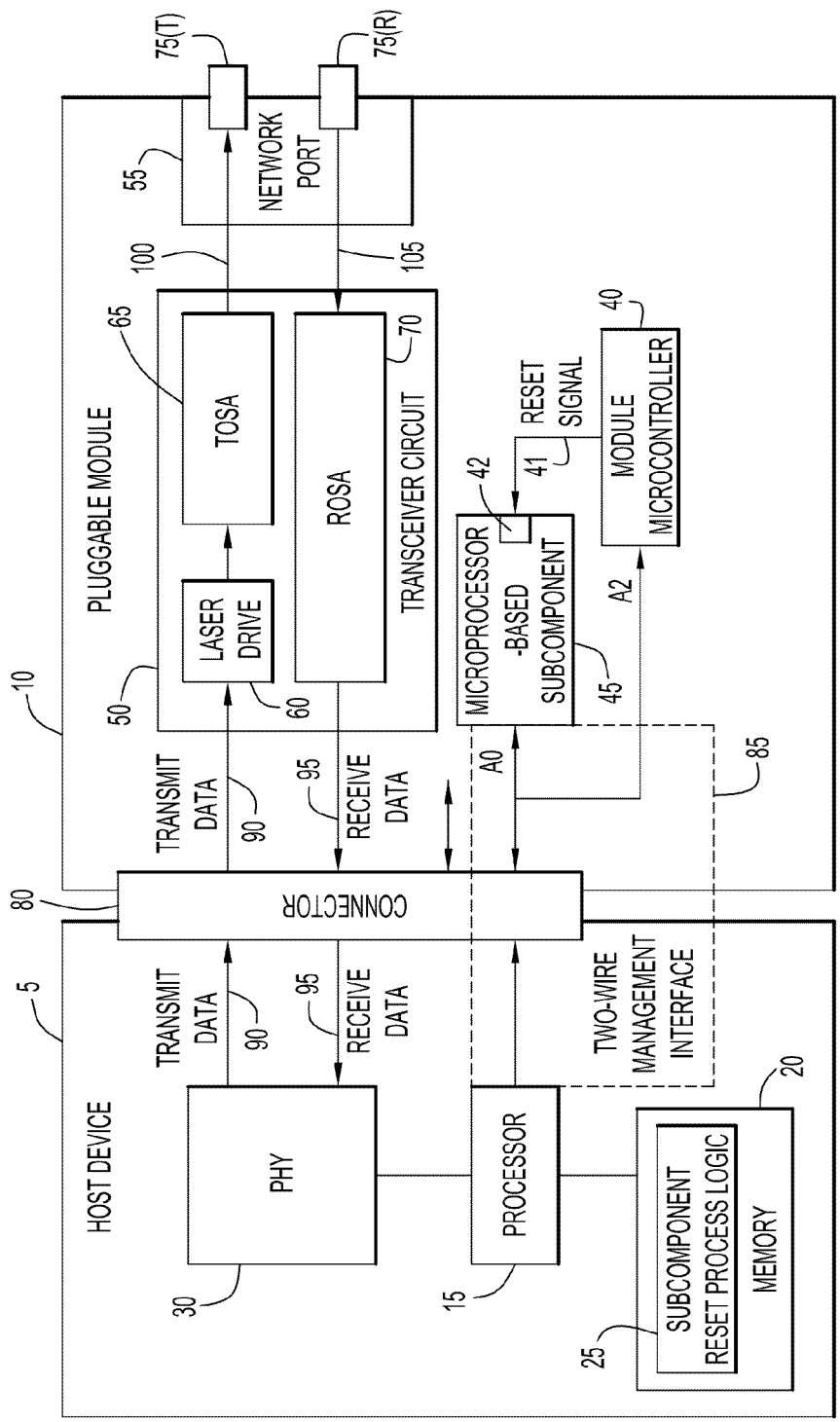
FIG. 1 is a block diagram of an example of a host device connected to a pluggable module having a microprocessor-based subcomponent, where the host device is configured to reset the microprocessor-based subcomponent according to the techniques described herein.

FIG. 1 is a block diagram of a host device 5 connected to a pluggable module 10. Host device 5 comprises a processor 15, a memory 20 that includes subcomponent reset process logic 25, and a physical (PHY) layer component 30. Pluggable module 10 includes a module microcontroller 40 configured to deliver a reset signal 41 to a reset pin 42 of a microprocessor-based subcomponent 45. Pluggable module 10 further comprises a transceiver circuit 50 and a network port 55. Transceiver circuit 50 includes a laser driver 60, a transmitter optical subassembly (TOSA) 65 and a receiver optical subassembly (ROSA) 70. Network port 55 includes optical connectors 75(T) and 75(R).

Host device 5 is coupled to pluggable module 10 via a connector 80. In the example of FIG. 1, connector 80 is formed by a plurality of electrical pins in host device 5 that are connected to a plurality of electrical pins in pluggable module 10. As such, in practice, connector 80 is formed by two mating connector parts, one in each of host device 5 and pluggable module 10. Accordingly, each of host device 5 and pluggable module 10 includes a connector part, but for simplicity they are collectively shown as connector 80.

Connector 80 includes a two-wire management interface 85 between host device 5 and pluggable module 10. The two-wire management interface 85 (also known as the $I^2C$ management bus) physically includes two bi-directional active connections (wires) and a ground connection. The active connections are known as serial data (SDA) lines, which carry the data bits, and serial clock (SCL), which is used as a clock signal. Further details of the two-wire management interface 85 are provided below.

The host device 5 may be, for example, a network switch or a router, and pluggable module 10 is a link for the host device 5 to a fiber optic or other cable (not shown in FIG. 1). Processor 15 in host device 5 controls the transfer of data over two-wire management interface 85. Although in the example of FIG. 1 the two-wire management interface 85 is controlled by processor 15, it should be appreciated that one or more other elements may also be included to operate with, or replace processor 15, for control of two-wire management interface 85. For example, in one alternative form, host device 15 may include a separate interface controller in the form of a Field Programmable Gate Array (FPGA), Application Specific Integrated Circuit (ASIC), etc., that controls operation of the two-wire management interface 85. Examples are described below with reference to the processor 15 controlling two-wire management interface 85.

Processor 15 is connected to memory 20 that includes the subcomponent reset process logic 25. Memory 20 may comprise read only memory (ROM), random access memory (RAM), magnetic disk storage media devices, optical storage media devices, flash memory devices, electrical, optical, or other physical/tangible memory storage devices. The processor 15 is, for example, a microprocessor or microcontroller that executes instructions stored in memory 20. Thus, in general, the memory 20 may comprise one or more computer readable storage media (e.g., a memory device) encoded with software comprising computer executable instructions and when the software is executed (by the processor 15), it is operable to perform the operations described herein in connection with subcomponent reset process logic 25. The details of the operations associated with subcomponent reset process logic 25 are provided below.

Processor 15 is further connected to PHY 30. PHY 30 comprises the basic hardware transmission capabilities of host device 5 to modulate electrical signals to produce transmit data 90 that are supplied by connector 80 to transceiver circuit 50 in pluggable module 10. PHY 30 also receives electrical signals, referred to as receive data 95, from transceiver circuit 50, and demodulates the receive signals for recovering the data contained therein for use by the host device.

Transceiver circuit 50 in pluggable module 10 is configured to generate transmit signals 100 for transmission via network port 55, and to process receive signals 105 received via the network port. More specifically, laser driver 60 in transceiver circuit 50 receives transmit data 90 and generates drive signals for an LED or an injection laser diode in TOSA 65 that generates the optical transmit signals 100. Transmit signals 100 are provided to an optical fiber cable via optical connector 75(T) in network port 55. Similarly, optical receive signals 105 are received by ROSA 70 via optical connector 75(R), and converted to electrical receive data 95.

FIG. 1 is an example in which pluggable module 10 converts electrical signals to optical signals for transmission via an optic fiber cable. It should be appreciated that in a different form, pluggable module may be configured to convert one form of electrical signals to another form (i.e., conversion from one electrical bandwidth to another electrical bandwidth) for transmission via a network cable. As such, in other forms, transceiver circuit 50 and network port 55 may be used with, for example, copper cable media.

Microcontroller 40 of pluggable module 10 controls operations of the pluggable module 10 and components thereof, such as transceiver circuit 50 and network port 55. Microprocessor-based subcomponent 45 is a functional component that is configured to perform one or more operations, such as the custom security subcomponents for identification or validation of genuine products, the PHY or the analog-to-digital or digital-to-analog controllers for digital optical monitoring functionalities etc. Subcomponent 45 is referred to as being microprocessor-based because it is an integrated circuit (IC) having a microprocessor therein that controls operation of the subcomponent.

With microprocessor-based subcomponent 45, there is a risk of subcomponent malfunction, including microprocessor freeze or lockup, slow operation or erratic behavior. Microprocessor lockup is a situation in which the microprocessor stops processing, resulting in a stack overflow. As such, the processor obtains incorrect data when it tries to return from a subroutine where it will begin executing code in some unpredictable way, thereby resulting in subcomponent crash or lockup.

These types of malfunctions often result in a need to reset the microprocessor-based subcomponent 45. However, because the processor of the microprocessor-based subcomponent 45 is separate from microcontroller 40, malfunction of the microprocessor-based subcomponent 45 does not necessarily affect operation of other elements of pluggable module 10. That is, the other elements of pluggable module 10 may continue to operate even though microprocessor-based subcomponent 45 may have malfunctioned. For example, data communication may continue through pluggable module 10 without interruption.

According to industry standards, the defined reset capability of a pluggable module is at the module level. That is, if any element of pluggable module malfunctions, the entire module generally must be reset. This module level reset allows a pluggable module to be reset and cleared remotely, without requiring a technician to visit the site and manually reset the module. However, such module level reset is catastrophic to data traffic through the module.

As noted above, a pluggable module, such as pluggable module 10, may continue to operate even though a microprocessor-based subcomponent, such as subcomponent 45, has malfunctioned and requires a reset. Therefore, it is beneficial to be able to reset the microprocessor-based subcomponent 45 without requiring a module level reset that affects operation of the other elements of pluggable module 10. In the example of FIG. 1, this subcomponent specific reset is enabled through two-wire management interface 85, even through microprocessor-based subcomponent 45 does not have a reset pin that is directly accessible to host device 5.

In general, processor 15, through the use of subcomponent reset process logic 25, determines that microprocessor-based subcomponent 45 has malfunctioned and needs to be reset. This determination is based on messages sent to host device 5. For example, if nonsensical, unexpected or otherwise abnormal responses are received at the host device 5 from the pluggable module 10, then host device 5 can issue a reset command. Different subcomponents 45 would have different behaviors that could demonstrate a need for a reset.

When malfunction of subcomponent 45 is detected, processor 15 issues a command to module microcontroller 40 instructing the microcontroller 40 to reset subcomponent 45. Microcontroller 40 decodes the reset message and asserts a hard reset to subcomponent 45. More specifically, microcontroller 40 is connected to reset pin 42 of microprocessor-based subcomponent 45, and microcontroller 40 issues a reset signal 41 to reset pin 42 of the subcomponent. These operations are performed so as not to interfere with other operations within pluggable module 10, such as data flow through the module, thereby allowing reset of microprocessor-based subcomponent 45 without requiring a module level reset.

To enable the specific reset of microprocessor-based subcomponent 45, microcontroller 40 is addressable by processor 15 via two-wire management interface 85. Two-wire management interface 85 uses a master/slave relationship for the transfer of information. The master device is processor 15 and microcontroller 40 serves as a slave device. Because multiple slave devices may be addressable via a two-wire management interface, the MSA requires the master device (processor 15) to begin transmission with a seven-bit addressing procedure to identify the address of the slave device that should receive and reply to a message. This slave address is transferred in the first byte after a Start condition. The first seven bits of this byte include the slave address, while the eighth bit is the read/write flag. A low eight bit (0) indicates a write and a high eight bit (1) indicates a read. The bits in a byte are transmitted with the most significant bit (MSB) first, and end with the least significant bit (LSB).

In operation, the reset of microprocessor-based subcomponent 45 is defined in the A2 page of two-wire management interface 85. More specifically, microcontroller 40 is connected to address 0xA2 of two-wire management interface 85, and the reset command from host device 5 uses bits 2-0 in byte 255 of address 0xA2. In one form, in addition to the above address, address 0xA0, word addresses 0-254 in two-wire management interface may be used to access Electrically Erasable Programmable Read-Only Memory (EEPROM), while address 0xA0, word address 255, may be used to access the functionality of microprocessor-based subcomponent 45.

In one form, bits 2-0 in byte 255 of address 0xA2 are used for the reset of microprocessor-based subcomponent 45. In particular, if there is a "write" of these bits in the form of "111" (i.e., bits 2-0 in byte 255 of address 0xA2 are all high) from host device 5 to microcontroller 40, the microcontroller 40 executes a reset of microprocessor-based subcomponent 45. If there is a "write" of anything other than "111," microcontroller 40 takes no action. If there is a "read" by host device 5 from microcontroller 40 in which bits 2-0 are "111," the reset is in process. A "read" by host device 5 from microcontroller 40 in which bits 2-0 are "000" indicates that the reset of microcontroller 40 is complete and normal operation has commenced. As such, microcontroller 40 is configured to provide verification to host device 5 that the reset of microprocessor-based subcomponent 45 has occurred.

Figure 2:
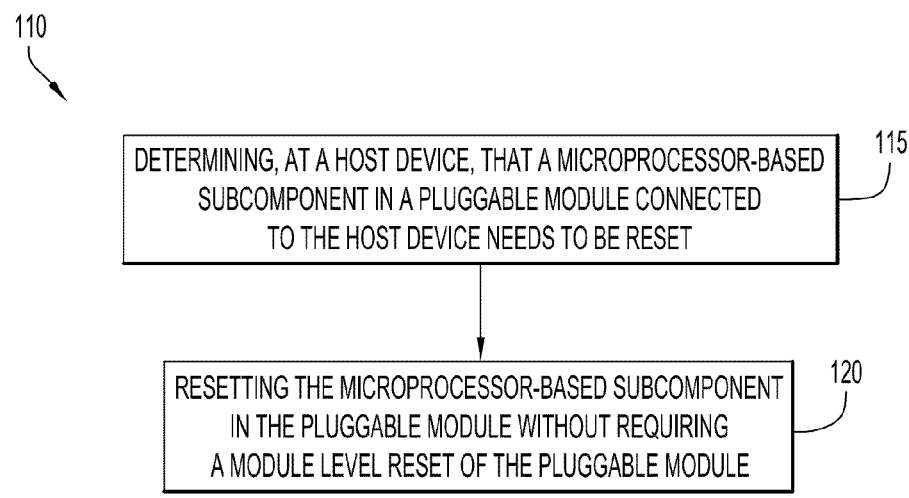
FIG. 2 is a flowchart illustrating example operations performed in the host device to reset the microprocessor-based subcomponent.

FIG. 2 is a flowchart of an example method 110 of operations performed in host device during malfunction and reset of a microprocessor-based subcomponent in a pluggable module attached to the host device. The operations of method 110 are carried out when subcomponent reset process logic 20 is executed in a host device. For ease of reference, the method of FIG. 3 will be described with reference to the elements of FIG. 1.

Method 110 of FIG. 2 begins at 115 where the host device determines that microprocessor-based subcomponent 45 has malfunctioned so as to warrant a reset. A malfunction may be determined when a microprocessor in subcomponent 45 has stopped executing instructions (e.g., 'locked up' or 'frozen' due to one or more errors), is running slow or is behaving erratically. Upon a determination of malfunction, at 120 the microprocessor-based subcomponent 45 is reset through a module specific reset that does not require reset of the entire pluggable module 10. That is, a module level reset is not required.

As noted above, in one form, bits 2-0 in byte 255 of address 0xA2 are used for the reset of microprocessor-based subcomponent 45. However, the remaining five bits (bits 7-3) in byte 255 of address 0xA2 may be used by pluggable module 10 for other functions. The subcomponent reset process logic 20 of host device 5 ensures that enabling the pin reset of subcomponent 45 will not change the values in these other 5 bits.

Figure 3:
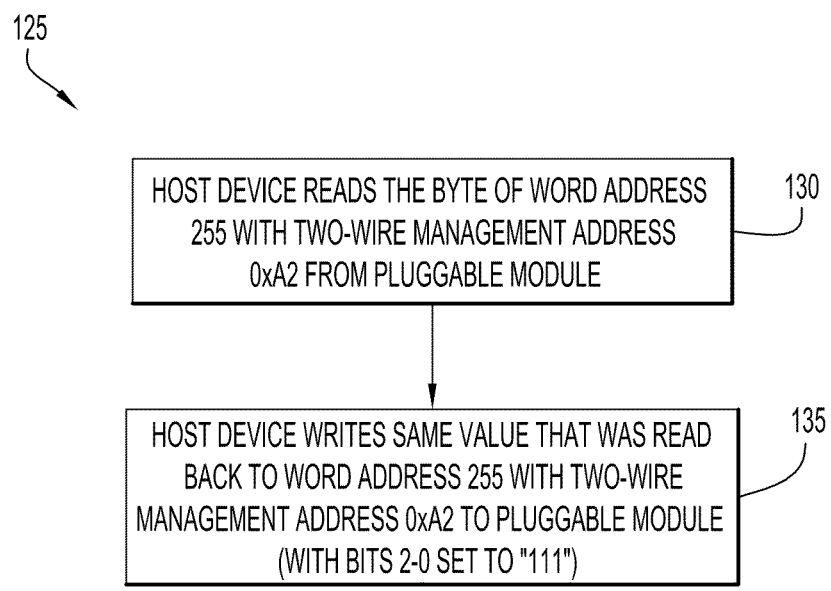
FIG. 3 is a flowchart illustrating example read and write operations of the host device to reset the microprocessor-based subcomponent in the attached pluggable module.

In one example, this is performed by host device 5 addressing microcontroller 40 at a particular address of two-wire management interface 85 during the resetting operation of FIG. 2. More specifically, the resetting operation 120 of FIG. 2 includes host device 5 reading a byte at a word address of the particular address from the pluggable module, and writing the byte back to the word address of the particular management address so as to include the same value for some of the bits of the byte that were read and setting high other bits of the byte. FIG. 3 illustrates a more detailed example method 125 for implementing such a reset without affecting other bits with the particular address.

In the example of FIG. 3, the particular address used to address microcontroller 40 is address 0xA2, word address 255. At 130, host device 5 reads the byte of word address 255 at address 0xA2 from pluggable module 10. At 135, host device 5 writes the same value read at 130 back to word address 255 at address 0xA2 to pluggable module 10, except that bits 2-0 are set to "111." That is, the bits 7-3 during this "write" operation are the same as were "read" in 130.

Figure 4:
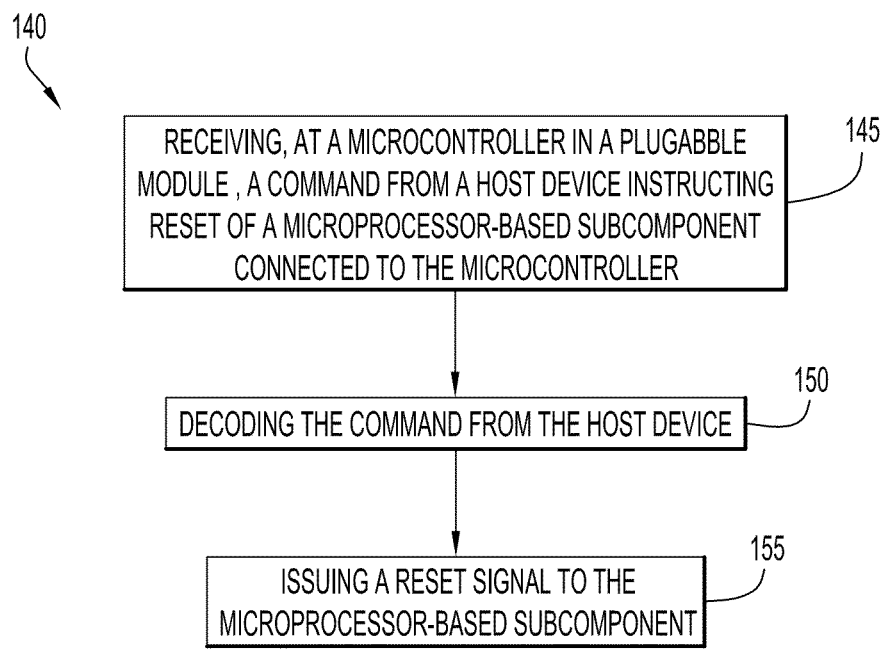
FIG. 4 is a flowchart illustrating example operations performed in the pluggable module to reset the microprocessor-based subcomponent.

FIG. 4 is a flowchart of an example method 140 of operations performed in pluggable module 10 during malfunction and reset of the microprocessor-based subcomponent 45. For ease of reference, the method of FIG. 4 will be described with reference to the elements of FIG. 1. Method 140 begins at 145 where microcontroller 40 receives a command from host device 5 instructing the microcontroller 40 to reset the microprocessor-based subcomponent 45. At 150, this command from host device 5 is decoded by microcontroller 40 and, at 155, the microcontroller issues the reset signal 41 to the reset pin 42 of microprocessor-based subcomponent 45. The microcontroller 40 issues the reset signal 41 without resetting or otherwise disrupting other operations, such as the transmit and receive operations of the pluggable module.

Figure 5:
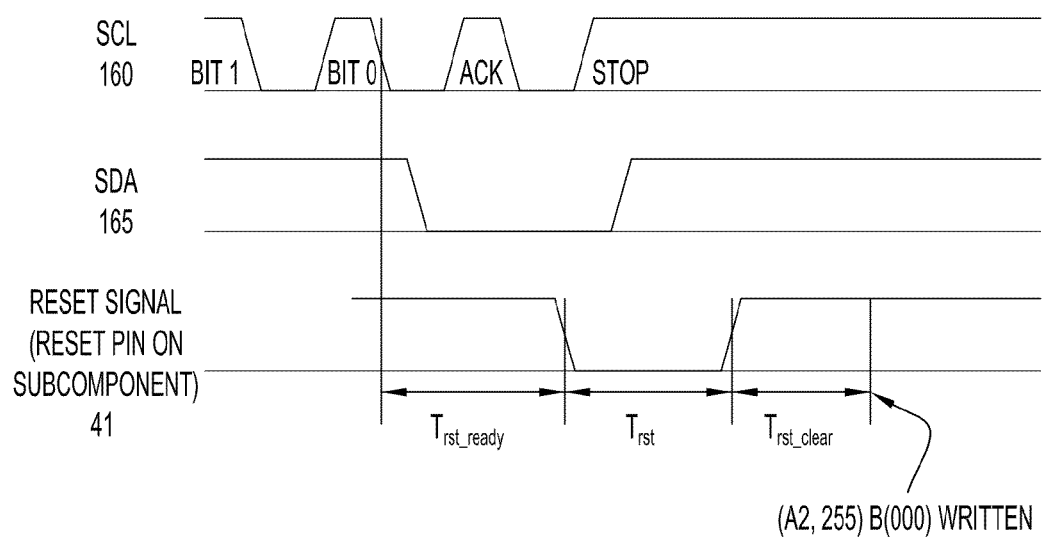
FIG. 5 is a timing diagram of example microprocessor-based subcomponent reset operations.

FIG. 5 is a timing diagram associated with signals during reset of microprocessor-based subcomponent 45. Specifically, FIG. 5 illustrates the relative timing of SCL shown at 160 and SDA shown at 165 in the two-wire management interface and the reset signal 41 from microcontroller 40 to subcomponent 45. When host device 5 writes value "111" to bits 2-0 of word address 255 with two-wire management interface address 0xA2, microcontroller 40 in pluggable module 10 enables the reset signal to the reset pin 42 on subcomponent 45 for time Trst. At the end of Tsrt, microcontroller 40 disables the reset signal and clears bits 2-0 of word address 255 with two-wire management interface address 0xA2 back to "000".

The maximum delay, Trst_clear, required for bits 2-0 to be set back to "000" is 0.02-30 ms from the negate of the reset signal, as indicated in FIG. 5. (The reset signal 41 is an active low signal in this example). If anything other than "111" is written by host device 5 to bits 2-0 of word address 255 with two-wire management interface address 0xA2, microcontroller 40 will not enable the reset signal to the reset pin on subcomponent 45. When host device 5 reads the same bits, microcontroller 40 is still configured to reply with "000".

Figure 6:
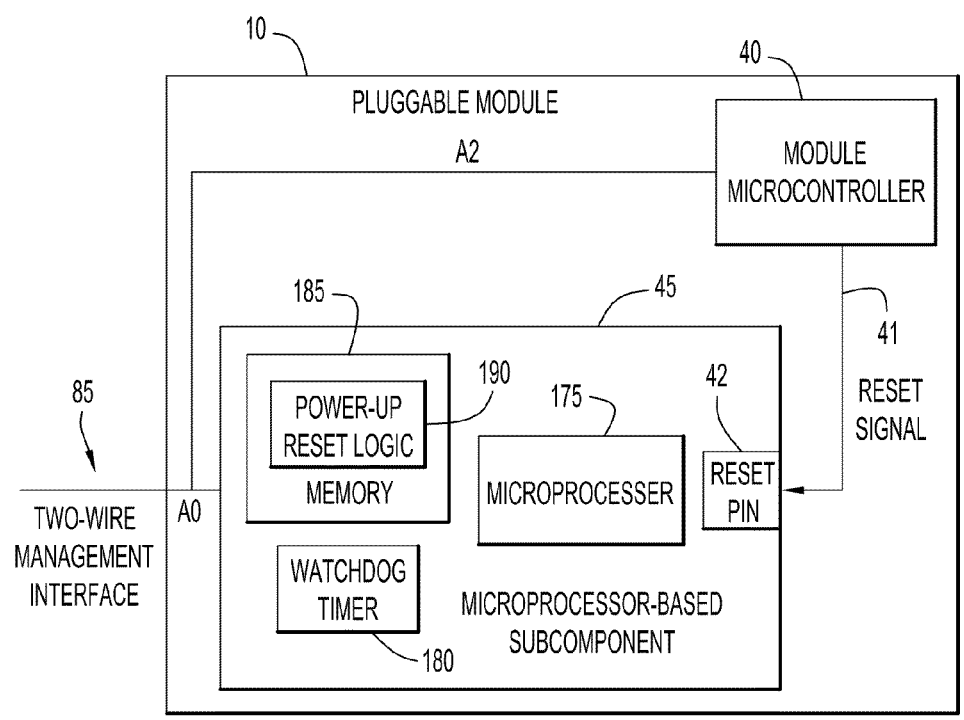
FIG. 6 is a block diagram of an example microprocessor-based subcomponent that is configured to be reset by the host device.

FIG. 6 is a block diagram of a portion of one form of pluggable module 10 of FIG. 1. More specifically, FIG. 6 illustrates additional functional details of one form of microprocessor-based subcomponent 45. For ease of illustration, other elements of pluggable module 10, such as transceiver circuit 50, connector 80 and network port 55 have been omitted from FIG. 6.

In the arrangement of FIG. 6, microprocessor-based subcomponent 45 includes a microprocessor 175, a watchdog timer 180, and a memory 185 that includes power-up reset logic 190. Microprocessor 175 is an example of the aforementioned microprocessor that may need to be reset according to the techniques described above. In operation, a pluggable module, such as module 10, takes time to become fully functional after power-up. Using power-up reset logic 190, microprocessor 175 will issue its own power-up reset, and no pin reset is required. Additionally, during this time, both host device 5 and microcontroller 40 are prevented from issuing a pin reset to subcomponent 45. This may be done by floating the reset pin of subcomponent 45 during the startup period of module 10.

As noted above, host device 5 has access to two-wire management interface address 0xA2 on pluggable module 10. However, in certain situations where the microprocessor-base subcomponent 45 is a security subcomponent (e.g., a special product source validation subcomponent) and some of the host hardware does not have access to the 0xA2 address to the module, the microprocessor-based subcomponent 45 may include a watchdog timer 180 to reset its microprocessor 175 if the watchdog timer detects software anomalies. Generally, a watchdog timer is based on a counter that counts down from some initial value to zero. The power-up reset logic 185 selects the counter's initial value and periodically restarts it. If the counter ever reaches zero before the software reset signal is asserted, the processor will be restarted and thus clears the lock-up.

As noted above, techniques are described herein that are generally directed to the reset of subcomponents within a pluggable module. Such reset may be performed in subcomponents of different types of modules such as, and not limited to, Small Form-Factor Pluggable (SFP), SFP+, Quad SFP (QSFP), 10 Gigabit SFP (XFP), etc. Additionally, these techniques may be useful in legacy platforms and provide a mechanism for host software to reset and clear module subcomponents without affecting normal user traffic The above description is intended by way of example only.

What is claimed is:

1. A method comprising:
   determining, at a host device, that a microprocessor-based subcomponent in a pluggable module connected to the host device needs to be reset; and
   resetting the microprocessor-based subcomponent in the pluggable module without requiring a module level reset of the pluggable module, wherein the resetting is initiated by the host device;
   wherein a microcontroller in the pluggable module is addressable at a particular management address of a two-wire management interface, and wherein resetting the microprocessor-based subcomponent comprises:
      reading, by the host device, a byte at a word address of the particular management address from the pluggable module; and
      writing the byte back to the word address of the particular management address so as to include the same value for some of the bits of the byte that were read and setting high other bits of the byte.

2. The method of claim 1, further comprising:
   verifying that the reset of the microprocessor-based subcomponent has occurred.

3. The method of claim 1, wherein determining that the microprocessor-based subcomponent needs to be reset comprises:
   receiving an unexpected response from the microprocessor-based subcomponent.

4. An apparatus comprising:
   a connector configured to connect to a pluggable module that comprises a microcontroller and a microprocessor-based subcomponent, wherein the connector includes a management interface to the pluggable module; and
   a host device comprising a processor configured to determine that the microprocessor-based subcomponent in the pluggable module needs to be reset, and reset the microprocessor-based subcomponent via the management interface without requiring a module level reset of the pluggable module;
   wherein the microcontroller in the pluggable module is addressable at a particular management address of a two-wire management interface, and wherein the host device is configured to reset the microprocessor-based subcomponent by:
      reading a byte at a word address of the particular management address from the pluggable module; and
      writing the byte back to the word address of the particular management address so as to include the same value for some of the bits of the byte that were read and setting high other bits of the byte.

5. The apparatus of claim 4, wherein the processor is further configured to verify that the reset of the microprocessor-based subcomponent has occurred.

6. The apparatus of claim 4, wherein the microprocessor-based subcomponent is configured to reset itself after startup.

7. An apparatus comprising:
   a connector configured to connect to a host device, wherein the connector is configured to provide bi-directional transfer of electrical signals with the host device;
   at least one network port configured to connect to a network cable;
   a transceiver circuit configured to generate transmit signals for transmission via the at least one network port and to process receive signals received via the network port;
   a microprocessor-based subcomponent; and
   a microcontroller configured to reset the microprocessor-based subcomponent in response to a command received from the host device without disrupting operation of the transceiver circuit, wherein the command to reset the microprocessor-based subcomponent is received after the host device has determined that a reset of the subcomponent is necessary,
   wherein the microcontroller in the pluggable module is addressable at a particular management address of a two-wire management interface in the connector, and wherein the microprocessor is configured to reset the microprocessor-based subcomponent after the host device reads a byte at a word address of the particular management address from the pluggable module and writes the byte back to the word address of the particular management address so as to include the same value for some of the bits of the byte that were read and setting high other bits of the byte.

8. The apparatus of claim 7, wherein the network cable is a fiber optic cable, and wherein the transceiver circuit is configured to convert electrical signals received at the connector to optical signals to be transmitted over the fiber optic cable and to convert optical signals received from the fiber optic cable to electrical signals.

9. The apparatus of claim 7, wherein the microprocessor-based subcomponent has a reset pin connected to the microcontroller and that is not directly accessible to the host device.

10. The apparatus of claim 7, wherein the microprocessor-based subcomponent is configured to allow the host device to verify that the reset of the subcomponent has completed.

11. The apparatus of claim 10, wherein the microprocessor-based subcomponent facilitates the verification via the two-wire management interface.

12. The apparatus of claim 7, wherein the microprocessor-based subcomponent comprises:
   a watch-dog module configured to interrupt operation of the subcomponent and reset the subcomponent microprocessor.

13. A method comprising:
   receiving, at a microcontroller in a pluggable module, a command from a host device instructing reset of a microprocessor-based subcomponent connected to the microcontroller, wherein the command to reset the microprocessor-based subcomponent is received after the host device has determined that a reset of the subcomponent is necessary;
   decoding the command from the host device; and
   issuing a reset signal to the microprocessor-based subcomponent,
   wherein the microcontroller in the pluggable module is addressable by the host device at a particular management address of a two-wire management interface, and wherein the reset signal is issued to the microprocessor-based subcomponent after the host device reads a byte at a word address of the particular management address from the pluggable module and commands the reset by writing the byte back to the word address of the particular management address so as to include the same value for some of the bits of the byte that were read and setting high other bits of the byte.

14. The method of claim 13, further comprising:
   providing verification to the host device that the reset of the microprocessor-based subcomponent has occurred.

15. The method of claim 13, further comprising the pluggable module converting electrical signals, received at a connector attached to the pluggable module, to optical signals and converting optical signals to electrical signals.

16. The method of claim 13, wherein issuing a reset signal to the microprocessor-based subcomponent comprises issuing the reset signal to a reset pin of the microprocessor-based subcomponent.

17. The method of claim 13, further comprising interrupting operation of the microprocessor-based subcomponent and resetting the subcomponent's microprocessor.

\* \* \* \* \*